(12) United States Patent
Ohashi et al.

(10) Patent No.: US 7,501,632 B2
(45) Date of Patent: Mar. 10, 2009

(54) TRICLINIC-STRUCTURE COMPOSITE OXIDE CONTAINING ZINC AND TUNGSTEN AND PHOSPHOR

(75) Inventors: Yoshihiro Ohashi, Tokyo (JP); Tomoyuki Oike, Yokohama (JP); Tatsuya Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/564,506

(22) Filed: Nov. 29, 2006

(65) Prior Publication Data

US 2007/0126344 A1 Jun. 7, 2007

(30) Foreign Application Priority Data

Dec. 7, 2005 (JP) ............................. 2005-353491

(51) Int. Cl.
*G01T 1/20* (2006.01)
*C09K 11/54* (2006.01)
*C09K 11/68* (2006.01)

(52) U.S. Cl. .......................... 250/361 R; 252/301.4 R; 252/301.5; 252/301.6 R (58) Field of Classification Search ............. 250/361 R; 252/301.4 R, 301.5, 301.6 R
See application file for complete search history.

(56) References Cited

U.S. PATENT DOCUMENTS 6,075,256 A 6/2000 Kaifu et al.
7,053,382 B2 * 5/2006 Noji et al. ............... 250/370.11
2005/0051736 A1 * 3/2005 Isoda et al. ............... 250/484.4
2005/0214573 A1 * 9/2005 Den et al. ................... 428/690

FOREIGN PATENT DOCUMENTS

JP 3066944 B2 5/2000

OTHER PUBLICATIONS

Kraus H., Mikhailik V.B., Ramachers Y., Day D., Hutton K.B., Telfer J.; "Feasibility Study of a ZnWO4 Scintillator for Exploiting Materials Signature in Cryogenic WIMP Dark Matter Searches"; Jan. 31, 2005; Physics Letters B; vol. 610; pp. 37-44.*
Redfern S.A.T.; Hard-Mode Infrared Study of the Ferroelastic Phase Transition in CuWO4-ZnWO4 Mixed Crystals; Sep. 1, 1993; Physical Review B; vol. 48; No. 9; pp. 5761-5765.*
Schofield P., Redfern S.A.T.; Ferroelastic Phase Transition in the Sanmartinite ZnWO4—Cuproscheelite CuWO4 Solid Solution; Jan. 13, 1992; Journal of Physics: Condensed Matter; vol. 4; No. 2; pp. 375-388.*
Chang L. L. Y.; Subsolidus Phase Relations in the System ZnWO4—ZnMoO4—MnWO4—MnMoO4; Nov. 7, 1968; Department of Geological Sciences, Cornell University, Ithaca, New York; pp. 992-996.*

* cited by examiner

*Primary Examiner*—David P Porta
*Assistant Examiner*—David S Baker
(74) *Attorney, Agent, or Firm*—Fitzpatrick, Cella, Harper & Scinto (57) ABSTRACT

There are provided a composite oxide of a triclinic crystal system comprising zinc and tungsten, and a production method thereof. Further, there is provided a light-emitting material comprising the composite oxide of triclinic crystal system comprising zinc and tungsten.

10 Claims, 6 Drawing Sheets

REGION A-1: TRICLINIC $Zn_x W_{2-x} O_4$ (ORIENTED FILM)
REGION A-2: TRICLINIC $Zn_x W_{2-x} O_4$ (NOT ORIENTED)    $1.0 \leq x \leq 1.5$
REGION B: TRICLINIC $ZnWO_4$ + MONOCLINIC $ZnWO_4$
REGION C: MONOCLINIC $ZnWO_4$ + $WO_3$

TRICLINIC-STRUCTURE COMPOSITE OXIDE CONTAINING ZINC AND TUNGSTEN AND PHOSPHOR

BACKGROUND OF THE INVENTION

1. Field of the Invention

The present invention relates to a triclinic structure composite oxide composed of zinc and tungsten, in particular, a phosphor widely used as a scintillation plate for detecting radiation, such as an electron beam and X-rays, and as various display devices.

2. Description of the Related Art

The tungstates ($MnWO_4$, $CoWO_4$, $NiWO_4$, $MgWO_4$, $CdWO_4$, $MnWO_4$ and the like) represented by a general formula $XWO_4$ are widely used as optical materials, such as scintillator materials and laser materials. Among these tungstates, particularly notable is $ZnWO_4$, where X=Zn. It is an optical material having a monoclinic structure referred to as SANMARTINITE, in which a tungsten atom is bonded to six oxygen atoms to form an octahedron. Its emission spectrum exhibits a broad blue-green light emission with a peak around 500 nm. This monoclinic system is the only structure represented by the formula $ZnWO_4$.

SUMMARY OF THE INVENTION

An object of the present invention is to provide a composite oxide of a novel crystal structure comprising zinc and tungsten, to be used as a light-emitting material for excitation by an electron beam, X-rays and ultraviolet light, and a production method thereof.

The present invention relates to a composite oxide of a triclinic crystal system comprising zinc and tungsten. As the composite oxide, a composite oxide represented by the chemical formula $ZnWO_4$ is preferably used. However, the composite oxide of the present invention is not limited to $ZnWO_4$, and is represented by a general formula $Zn_xW_{2-x}O_4$ and can form a triclinic zinc tungstate within a range of $0.5 \leq X \leq 1.5$. Such a composite oxide comprising zinc and tungsten is used as a light-emitting material.

It is preferable for the light-emitting material of the present invention to have a structure in which a particular crystal plane of the triclinic zinc tungstate crystal is grown approximately parallel to a substrate (i.e., a surface of the substrate). Incidentally, the term "approximately parallel" herein employed is intended to include not only the case where the crystal plane is parallel to the substrate, but also the case where the crystal plane has an inclination with respect to the substrate, but can be regarded as being substantially parallel to the substrate. Similarly, the term "approximately perpendicular" herein employed is intended to include not only the case where the crystal plane is perpendicular to the substrate, but also the case where the crystal plane has an inclination with respect to the substrate, but can be regarded as being substantially perpendicular to the substrate.

As the above-mentioned crystal plane, the (01-1) plane is included, but the above-mentioned crystal may have a structure in which the (001) plane or the (0-10) plane is grown approximately parallel to the substrate.

Further, it is preferred for the light-emitting material to have a columnar structure, which extends in a direction approximately perpendicular to the substrate. When the light-emitting material has such a columnar structure, light can be extracted approximately in the longitudinal direction of the columnar structure. Moreover, when detecting the light with two-dimensionally arranged photodetectors, the resolution can be improved.

The sectional shape in the direction parallel to the substrate of the columnar structure is preferably such that when the sectional shape is converted into a circle (referred to as "area-equivalent circle") having the same sectional area as that of the sectional shape of the columnar structure, the average value of the diameter of the circle falls within the range of 50 nm or more and 500 nm or less. The reason for limiting the range to 50 nm or more and 500 nm or less is that when the diameter of the columnar structure is markedly smaller or excessively larger than the wavelength of the generated light, the generated light is not scattered efficiently at the interface of the columnar structure. Hence, the efficiency of light extraction to the outside is reduced. Further, it is also preferable for the film thickness of the columnar structure to be 5 μm or less. The reason for limiting the thickness to 5 μm or less is that when the film is too thick, light generated at a position distant from the light extraction surface cannot be extracted to the outside due to absorption and scattering within the film.

The present invention also provides a production method in which the above-mentioned light-emitting material is formed on a substrate by means of a sputtering method. The present invention also provides a light-emitting device and a radiation scintillator using the above-mentioned phosphor, in particular, an inorganic EL element, an organic/inorganic composite light-emitting device, a fluorescent thin film for FED and a radiation scintillator.

According to the present invention, there can be obtained a composite oxide of a triclinic crystal system comprising zinc and tungsten. The above-mentioned material shows a green light emission with a peak at 530 nm and can be used as a light-emitting material, which emits a more pure green color than a conventional single-crystalline $ZnWO_4$, which has an emission peak at 500 nm. The material can be used for a light-emitting material widely employed as a scintillation plate for detecting radiation, such as an electron beam and X-rays, and as various display devices.

Other features of the present invention will become apparent from the following description of exemplary embodiments with reference to the attached drawings.

DESCRIPTION OF THE EMBODIMENTS

The embodiments of the present invention are described below.

First Embodiment

The First Embodiment is described with reference to FIGS. 1, 2, 3, 4, 5 and 6 using an example in which five phosphors of a triclinic crystal system having a chemical formula represented by $ZnWO_4$ were fabricated by using a sputtering method.

Figure 1:
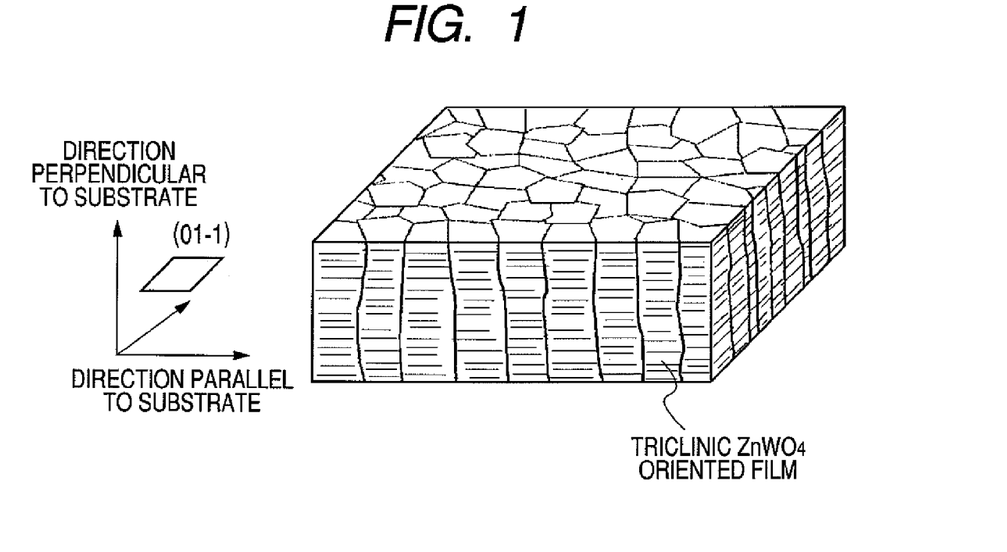
FIG. 1 is a schematic view showing a columnar light-emitting material of the present invention.

FIG. 1 is a schematic view showing a thin film phosphor fabricated in the present embodiment. The fabrication steps therefor are presented below.

Figure 2:
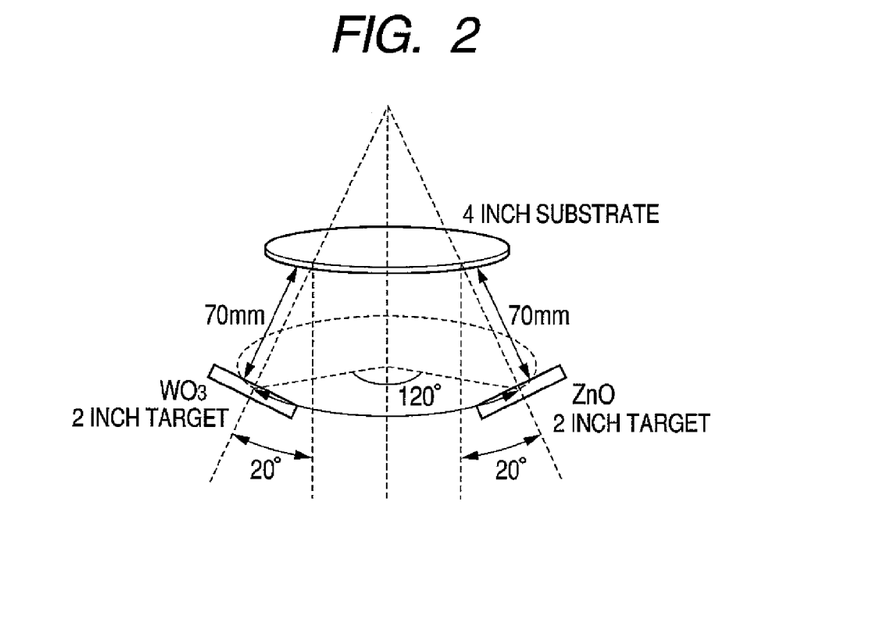
FIG. 2 is a schematic diagram showing a film preparation method of the present invention.

ZnO and $WO_3$ were simultaneously sputtered on a silicon substrate set at a substrate temperature of 600° C. by means of an RF sputtering method by using ZnO and $WO_3$ as targets to form a fluorescent thin film having a thickness of approximately 700 nm. FIG. 2 shows the positional relationship between the targets and the substrate holder at that time. As the targets, a ZnO target and a $WO_3$ target, each 2 inches in diameter, were used. As the substrate, a silicon substrate was used. The incident directions to the two targets were offset by 120° with respect to each other, the targets were inclined by 20° with respect to the direction perpendicular to the substrate, the intersection between normals from the centers of the respective target surfaces is located at a position which is offset upwardly with respect to the center of the substrate, the distance between the substrate and each of the targets was set to 70 mm, the output power for each of the targets was set to 150 W, and the film formation was carried out for 40 minutes.

Figure 3:
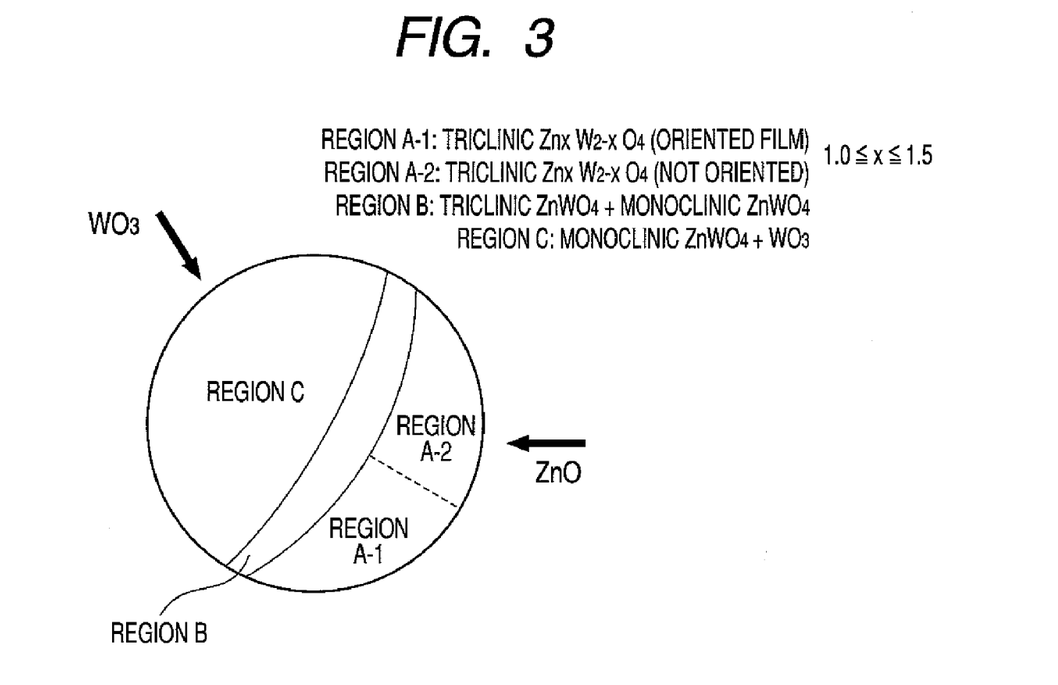
FIG. 3 is a schematic view showing a crystal structure formed in the film preparation method of the present invention.

The region within the substrate holder was divided into four regions shown in FIG. 3, and a 1-inch silicon substrate was placed in each of the regions and film formation was performed. The crystal structures formed in the respective regions are described below.

Regions A-1 and A-2

Figure 4:
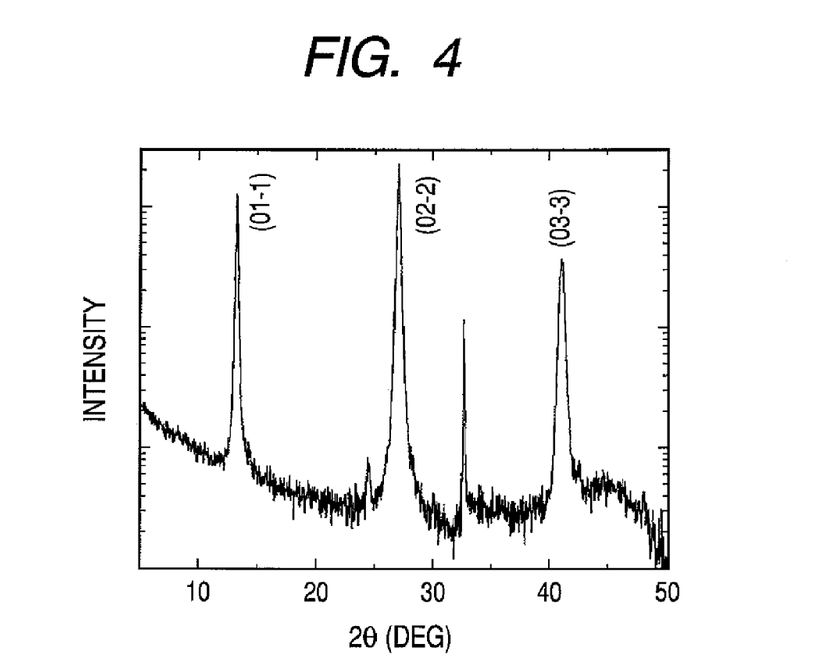
FIG. 4 is a graphical representation showing the results of the X-ray diffraction pattern of region A-1 of the present invention.
Figure 5:
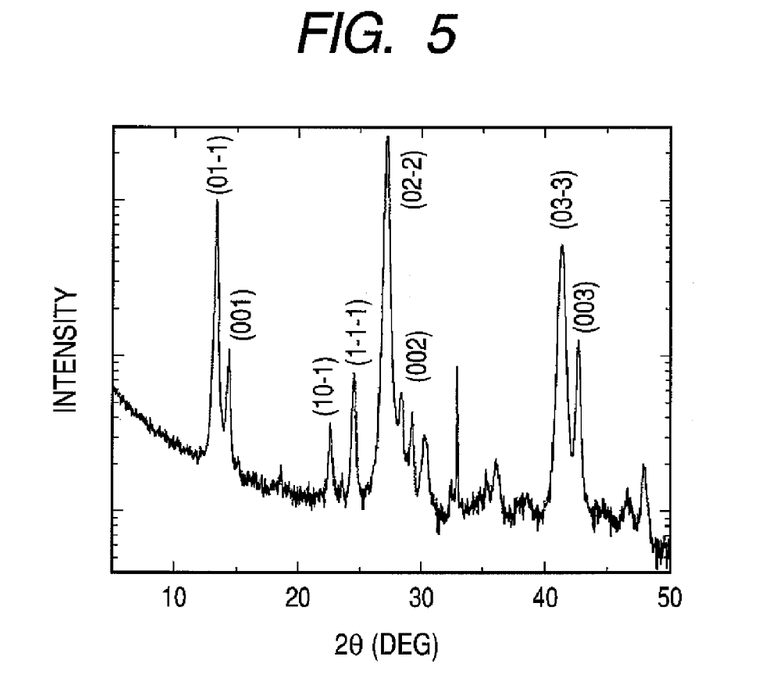
FIG. 5 is a graphical representation showing the results of the X-ray diffraction pattern of region A-2 of the present invention.

The formed films were irradiated with ultraviolet light and a fluorescence observation was performed, with the result that both the region A-1 and the region A-2 showed green light emission. The result of in-plane X-ray diffraction of the region A-1 is shown in FIG. 4, and the result of in-plane X-ray diffraction of the region A-2 is shown in FIG. 5. Characteristic peaks that were not able to be identified in the monoclinic $ZnWO_4$ appeared at low angles ($2\theta=13.5$, 14.6). Using transmission electron microscopy analyses, it was revealed that the crystal systems in the regions A-1 and A-2 were triclinic $ZnWO_4$ crystals with a novel structure.

Here, the compositions of the above-mentioned crystals are not limited to $ZnWO_4$, but the triclinic zinc tungstate of the present invention can be formed for the system represented by the general formula $Zn_xW_{2-x}O_4$, wherein X falls within the range of $0.5 \leq X \leq 1.5$. Because the region A was closer to the ZnO target, the triclinic $Zn_xW_{2-x}O_4$ fell within a region of $1.0 \leq X \leq 1.5$. In the X-ray analysis results shown in FIGS. 4 and 5, all the peaks were able to be identified on the basis of the assumption that the crystals were triclinic $ZnWO_4$ crystals. The three intense peaks shown in FIG. 4 were assigned to the (01-1), (02-2), and (03-3) peaks of the triclinic $ZnWO_4$, respectively, revealing that the (01-1) crystal plane is oriented with respect to the substrate. Further, by performing film formation while changing the positional relationship between the substrate and the targets and the conditions, such as the substrate temperature, there can be obtained a structure in which the (001) plane or the (0-10) plane is grown parallel to the substrate.

Additionally, the plane structure and the sectional structure of the region were observed by transmission electron microscopy. Consequently, it was confirmed that, as shown in FIG. 1, the structure was composed of an aggregate of columnar crystals of approximately 60 nm in diameter. Also, based on electron beam diffraction analysis, it was confirmed that the columnar crystals were oriented.

Figure 8:
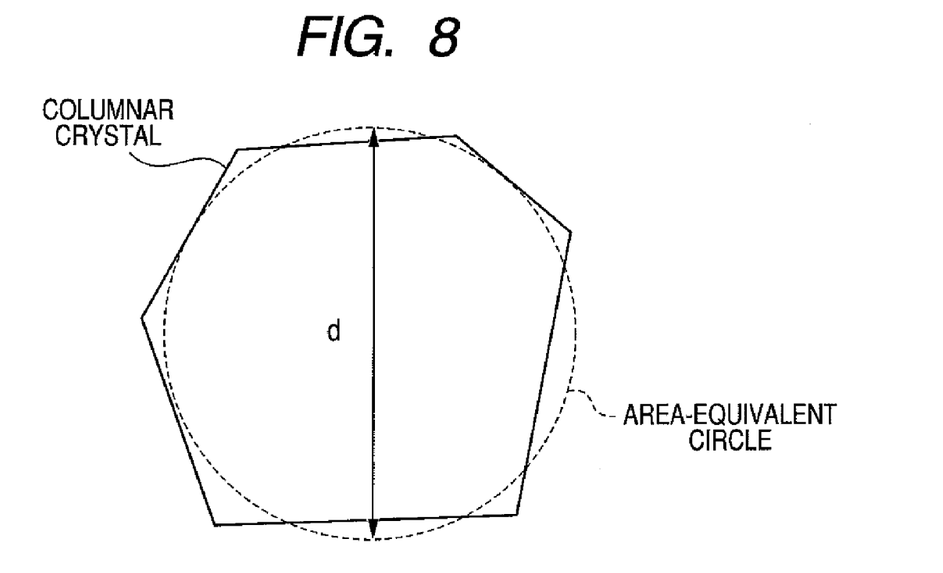
FIG. 8 is a schematic diagram illustrating a method of obtaining a diameter by converting a sectional shape of a microcrystal into a circular shape.
Figure 10:
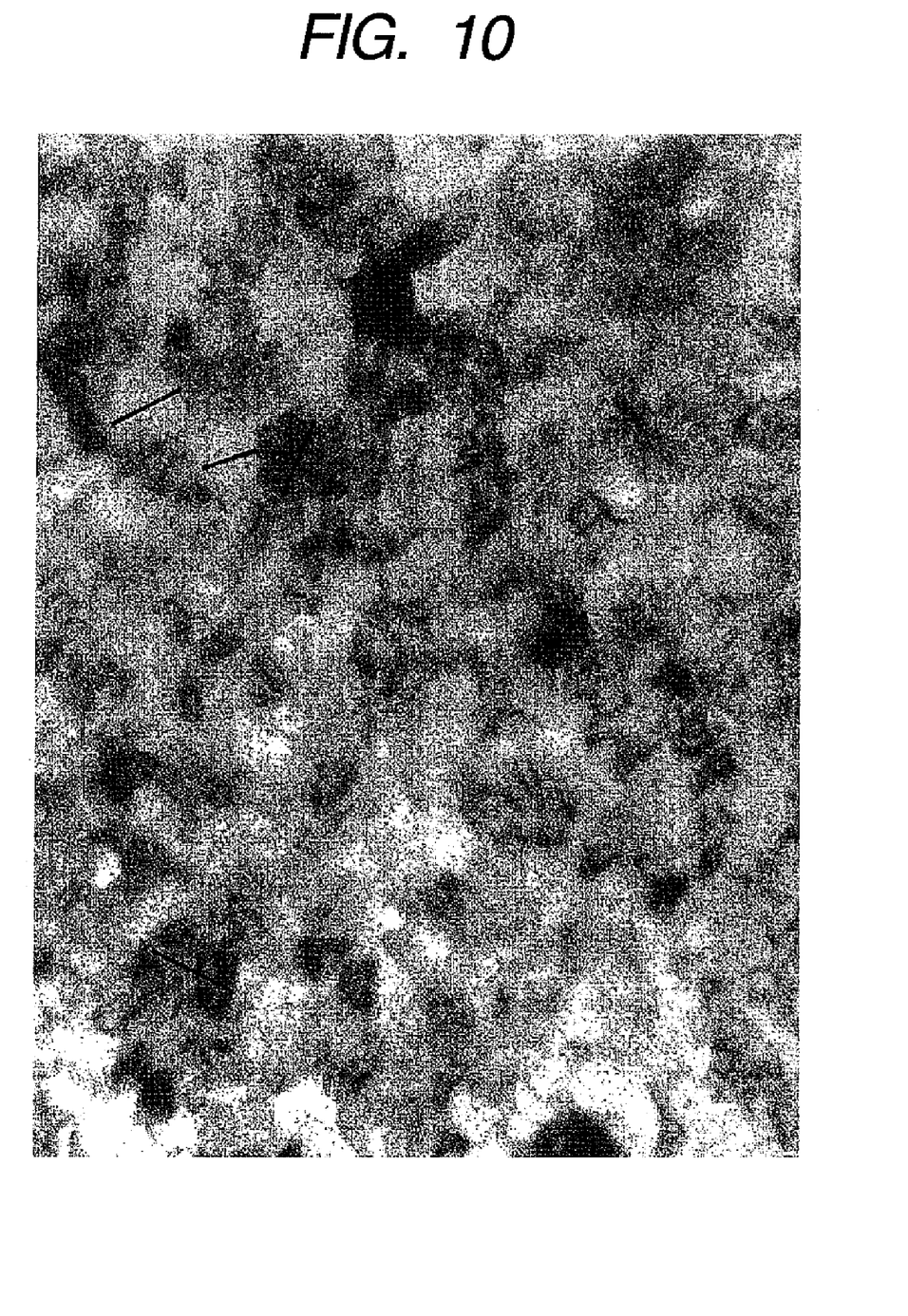
FIG. 10 is a TEM (transmission electron microscope) photograph showing a section of a columnar crystal.

The respective peaks of the X-ray diffraction pattern shown in FIG. 5 were able to be identified as the peaks of the triclinic $ZnWO_4$. The plane structure and the sectional structure were observed by transmission electron microscopy, and it was confirmed that the structure was composed of an aggregate of microcrystals approximately 60 nm in diameter. Also, based on electron beam diffraction analysis, it was confirmed that the microcrystals were not oriented. For the evaluation of the size of the microcrystals, on the basis of the crystal sectional shape as shown in FIG. 10, a microcrystal sectional shape was converted into a circle as shown in FIG. 8 (here, a hexagonal shape is depicted, but the actual shape is not particularly limited). Thus, the diameter d of the circle was calculated (the solid lines in FIG. 10 indicate the diameters of circles obtained by the conversion) and the obtained d values for the microcrystals were averaged. Consequently, the average value of the diameters of the circles obtained by the conversion was found to be 60 nm. FIG. 10 is a TEM (transmission electron microscope) photograph showing the section.

The shape of a section in the direction parallel to the substrate of the columnar structure is preferably such that when the shape is converted into a circle having the same area as that of the shape, the diameter of the circle falls within the range from 50 nm to 500 nm on average.

Figure 6:
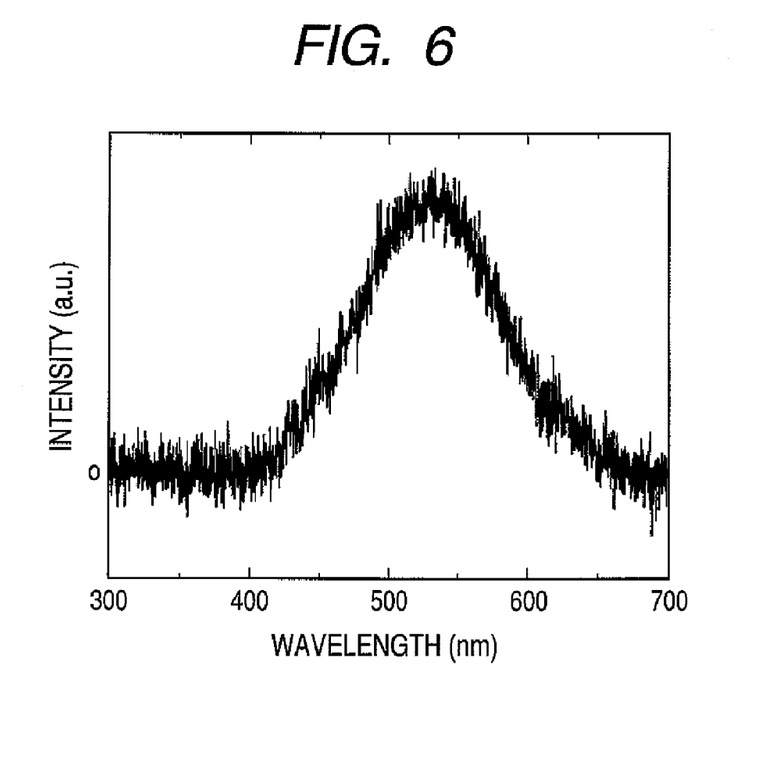
FIG. 6 is a graphical representation showing the results of a cathode luminescence measurement of the region A-1 of the present invention.

FIG. 6 shows the results of measurement of cathode luminescence for a thin film made in the region A-1 with 80 keV electron beam irradiation in a transmission electron microscope. The emission spectrum had a peak around 530 nm and was found to be shifted to the longer wavelength side compared to the monoclinic $ZnWO_4$.

Region B

The structure obtained was such that the two crystals, namely, triclinic $ZnWO_4$ crystal of the present invention and monoclinic $ZnWO_4$ crystal (SANMARTINITE), were mixed with each other. Observation of fluorescence by ultraviolet irradiation produced a blue light emission.

Region C

In addition to the monoclinic $ZnWO_4$ crystal (SANMARTINITE), $WO_3$ was deposited due to the proximity of the region C to the $WO_3$ target. Observation of fluorescence by ultraviolet irradiation produced a blue light emission resulting from the monoclinic $ZnWO_4$ crystal.

As described above, the use of the present production method has made it possible to fabricate a triclinic $ZnWO_4$ crystal that is a novel crystal system, as a crystal structure represented by the formula $ZnWO_4$. Additionally, the present production method has also made it possible, in a special case, to fabricate a thin film light-emitting material having a structure in which a specific crystal plane of the triclinic $ZnWO_4$ crystal is grown parallel to the substrate.

The film thickness of the triclinic $ZnWO_4$ crystal is preferably set to be 5 μm or less. This is because when the film is too thick, light generated at a position distant from the light extraction surface cannot be extracted to the outside due to absorption and scattering within the film.

Second Embodiment

The present embodiment is another embodiment in which a sputtering method was used to fabricate triclinic $ZnWO_4$ crystals oriented with respect to a substrate.

A 1-μm thick $ZnWO_4$ film was formed on a 4-inch silicon substrate by using a target having a compositional ratio $ZnO:WO_3$ adjusted to 1.2:1 at a substrate temperature of 600° C. via an RF sputtering method. The X-ray diffraction analysis of the thus formed film revealed that, in the entire region of the substrate, the film was formed of a triclinic $ZnWO_4$ crystal. Additionally, when the plane structure and the sectional structure were observed by transmission electron microscopy, the structure was such that columnar crystals of approximately 100 nm in diameter were aggregated and oriented with respect to the substrate, as is the case in the First Embodiment.

Third Embodiment

Figure 7:
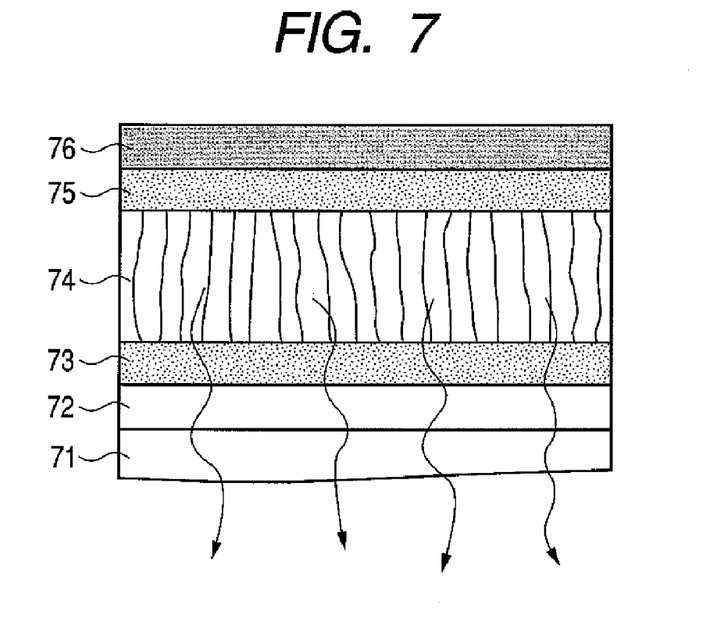
FIG. 7 is a schematic view showing the configuration of a light-emitting device of the present invention.

In the present embodiment, an example of the fabrication of a light-emitting device using triclinic $ZnWO_4$ in a light-emitting portion thereof is described. FIG. 7 is a sectional view showing the light-emitting device of the present example fabricated by a sequence of steps. Description is made below on the steps sequentially.

A transparent electrode 72 was formed as a film on a transparent substrate 71, and thereafter, a dielectric thick film 73 was formed thereon. Then, by using a target having a compositional ratio $ZnO:WO_3$ adjusted to 1:1 by volume, a 1-μm thick $ZnWO_4$ film 74 was formed at a substrate temperature of 600° C. via an RF sputtering method. Then, another dielectric thick film 75 was formed thereon, and finally, an electrode 76 was formed thereon.

Subsequently, when a 1-kHz AC voltage was applied in a gradually increasing manner between the transparent electrode 72 and the electrode 76, a green light emission could be observed at about 100 V.

Fourth Embodiment

The application of the present invention as a radiation scintillator in a radiation imaging system is made possible by combining triclinic $ZnWO_4$, which emits light by being irradiated, and photodetectors for detecting the generated light and converting the light into an image (electric signals). As the photodetectors, a one-dimensionally or two-dimensionally arranged sensor panel can be used. For example, when used as an imaging system for a transmission electron microscope, the imaging system is constituted by a scintillation plate formed of triclinic $ZnWO_4$, a bundle of optical fibers as an optical waveguide, and photo detectors (CCDs).

Moreover, there can be used, as a sensor panel, one in which TFTs made of amorphous silicon serving as switching elements, and pixels formed of PIN-type or MIS-type photodetectors, are one-dimensionally or two-dimensionally arranged on an insulating substrate. A radiation detector can be constructed by bonding to each other, with an adhesive, a radiation scintillator formed of triclinic $ZnWO_4$, which emits light by being irradiated, and such a sensor panel. Further, triclinic $ZnWO_4$, which emits light by being irradiated, can be stacked directly on a sensor panel.

Figure 9:
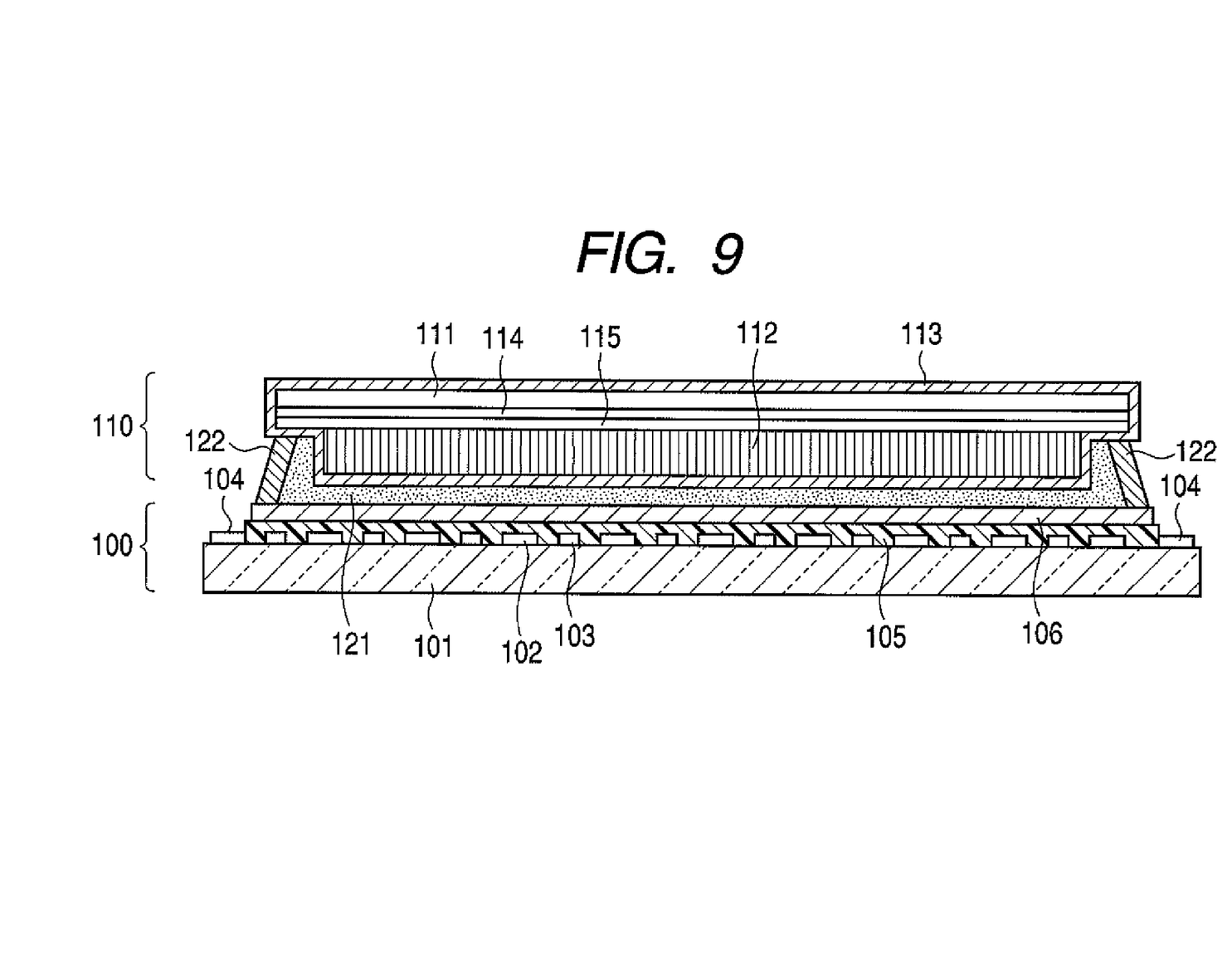
FIG. 9 is a sectional view of a radiation detector in which a radiation scintillator panel is bonded to a sensor panel having a plurality of photosensors and TFTs disposed thereon.

FIG. 9 is a sectional view of a radiation detector in which a radiation scintillator panel 110 bonded to a sensor panel 100, in which a plurality of pixels each composed of a photodetector element (photoelectric conversion element) and a TFT, are disposed two-dimensionally. In FIG. 9, reference numeral 101 denotes a glass substrate, 102 denotes a photoelectric conversion element composed of a photodetector element using amorphous silicon and a TFT, and 103 denotes a wiring portion. Additionally, 104 denotes an electrode take-out portion, 105 denotes a first protective layer formed of silicon nitride or the like, and 106 denotes a second protective layer formed of a resin film or the like. Additionally, 111 denotes a supporting substrate, 114 denotes a reflecting layer, 115 denotes an underlying layer, 112 denotes a phosphor layer composed of columnar phosphors, and 113 denotes a moisture-resistant protective layer formed of an organic resin or the like. The two-dimensional photodetector 100 is constituted by 101 to 106, and the scintillator panel 110 is constituted by 111 to 115. Reference numeral 121 denotes an adhesive layer formed of a transparent adhesive, and 122 denotes a sealing (or encapsulating) portion. As described above, the photodetector (sensor panel) 100 and the scintillator panel 110 are bonded to each other with the interposition of the adhesive layer 121 to provide a radiation detector. The photodetectors and the TFTs in the photoelectric conversion element portion have the same layer configuration, which is disclosed, for example, in Japanese Patent No. 3066944.

The photodetectors in the photoelectric conversion element portion may be disposed on the TFTs with the interposition of an insulating layer, and may be connected thereto through contact holes.

The present invention is applied to a phosphor widely used as a scintillation plate to detect radiation, such as an electron beam and X-rays, and as various display devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-353491, filed Dec. 7, 2005, which is hereby incorporated by reference herein in its entirety.

What is claimed is:

1. A composite oxide having a triclinic crystal structure represented by a chemical formula of $Zn_xW_{2-x}O_4$, where $1.0 \leq X \leq 1.5$.

2. The composite oxide according to claim 1, wherein the composite oxide is represented by a chemical formula of $ZnWO_4$.

3. A phosphor using the composite oxide set forth in claim 1 as a light-emitting material.

4. The phosphor according to claim 3, having a structure in which a specific crystal plane of the triclinic crystal as the light-emitting material is grown approximately parallel to a substrate.

5. The phosphor according to claim 3, wherein the light-emitting material has a columnar structure extending in a direction approximately perpendicular to a substrate.

6. The phosphor according to claim 5, wherein the shape of a section parallel to the substrate of the columnar structure is such that when the sectional shape is converted into a circle having the same area as the area of the sectional shape, the diameter of the circle falls, on average, within the range from 50 nm to 500 nm.

7. The phosphor according to claim 5, wherein the film thickness of the columnar structure is 5 µm or less.

8. A light-emitting device comprising the phosphor set forth in claim 3 and a pair of electrodes for applying an electric field to the phosphor.

9. A radiation scintillator using the phosphor set forth in claim 3.

10. A radiation detector, comprising the radiation scintillator set forth in claim 9 and a sensor panel having a photodetector element for converting light from the radiation scintillator to an electric signal.

* * * * *